Feb. 28, 1933.  R. D. SMITH  1,899,485
METHOD OF AND MEANS FOR TREATING GLASS ARTICLES
Filed June 12, 1930    3 Sheets-Sheet 1

INVENTOR
Rowland D. Smith.
BY
ATTORNEY

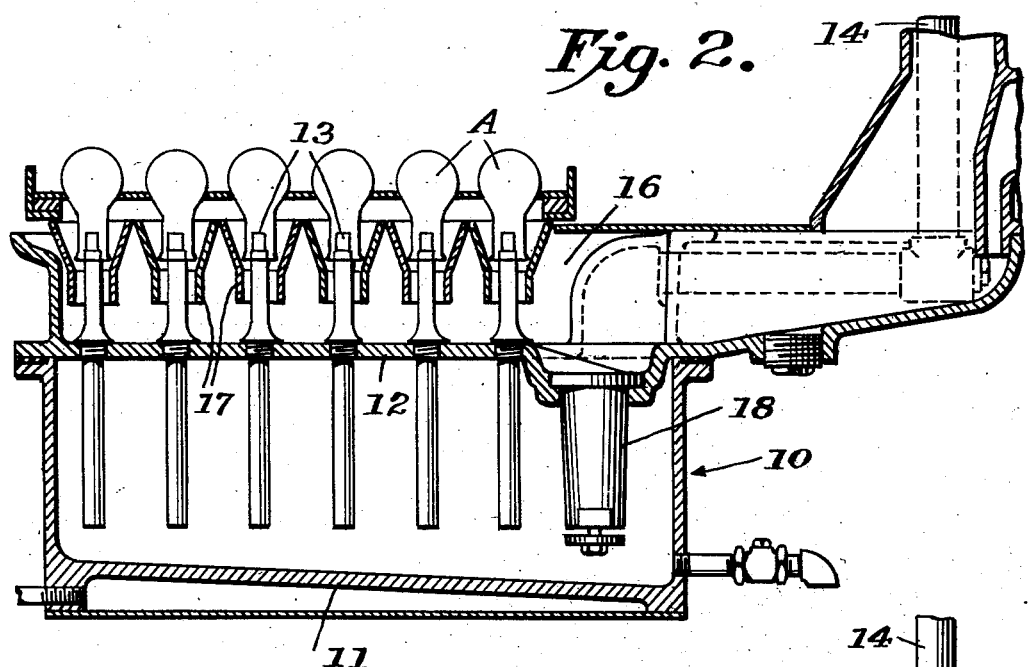
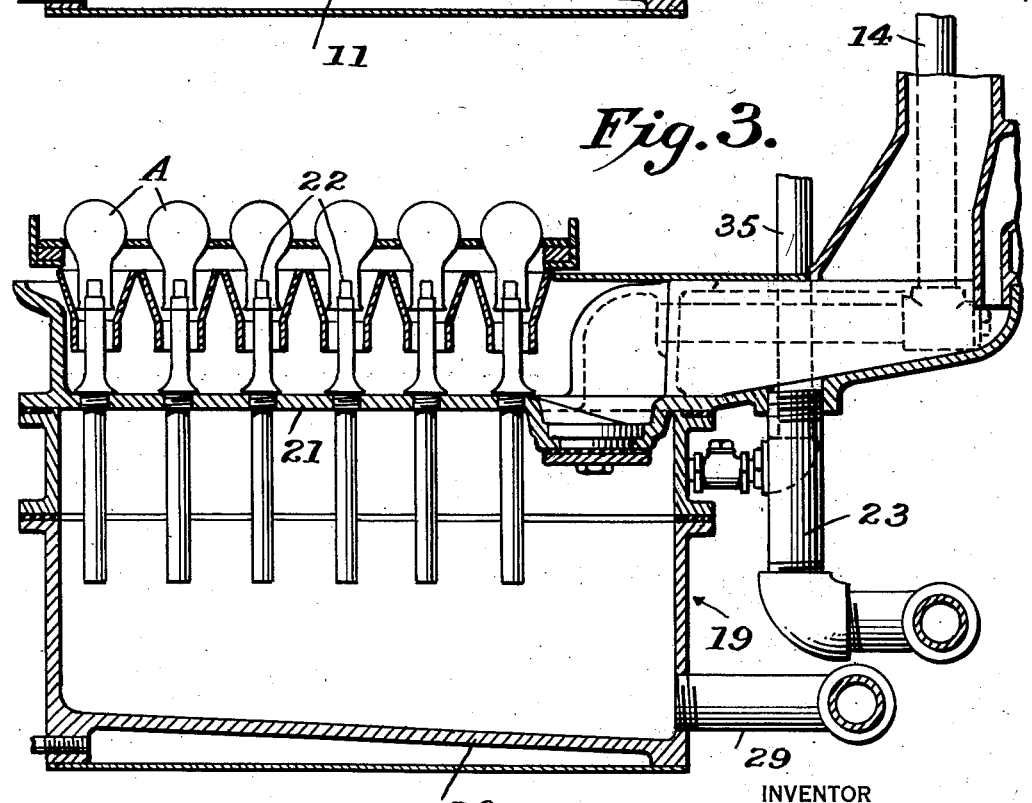

Patented Feb. 28, 1933

1,899,485

UNITED STATES PATENT OFFICE

ROWLAND D. SMITH, OF CORNING, NEW YORK, ASSIGNOR TO CORNING GLASS WORKS, OF CORNING, NEW YORK, A CORPORATION OF NEW YORK

METHOD OF AND MEANS FOR TREATING GLASS ARTICLES

Application filed June 12, 1930. Serial No. 460,702.

This invention relates to a method of and means for treating glass articles and more particularly to a method of saving frosting solution.

In frosting bulbs it is customary to spray them with a frosting solution and then advance them into a rinsing tank where they are sprayed with clear water to wash away any adhering frosting solution. The frosted surfaces of the bulbs are then fortified by spraying them with a dilute frosting solution after which the bulbs are washed by transferring them to a tank containing clear water and spraying them to remove all traces of the fortifying solution. This method has been found wasteful, as due to its viscosity a considerable quantity of frosting solution would adhere to each bulb and be carried over to the rinsing position where it would be washed out and discharged as waste resulting in the complete loss of valuable chemicals, whose period of utility had not been entirely spent. The magnitude of such losses has become so great that many bulb frosting plants found it advantageous to install apparatus for recovering the chemicals from the rinsing water. This not only increases the amount of capital invested in equipment but requires additional labor for its maintenance so that in spite of the savings effected there is yet considerable outlay involved.

The object of the present invention is to effect economies in the frosting of bulbs without requiring the installation of a chemical recovering plant for removing the unspent chemicals from the rinsing water.

Another object is to improve the uniformity of the frosted surfaces.

In carrying the invention into practice, I use a frosting unit of the type usually employed, a water rinsing unit, a fortifying unit, and a final washing unit but my method differs from the usual procedure in that I introduce a fortify-rinse unit between the frosting and water rinsing units.

In the drawings:

Fig. 2 is a vertical sectional view through the frosting unit;

Fig. 3 is a view similar to Fig. 2 through the fortify-rinse unit;

Figure 1:
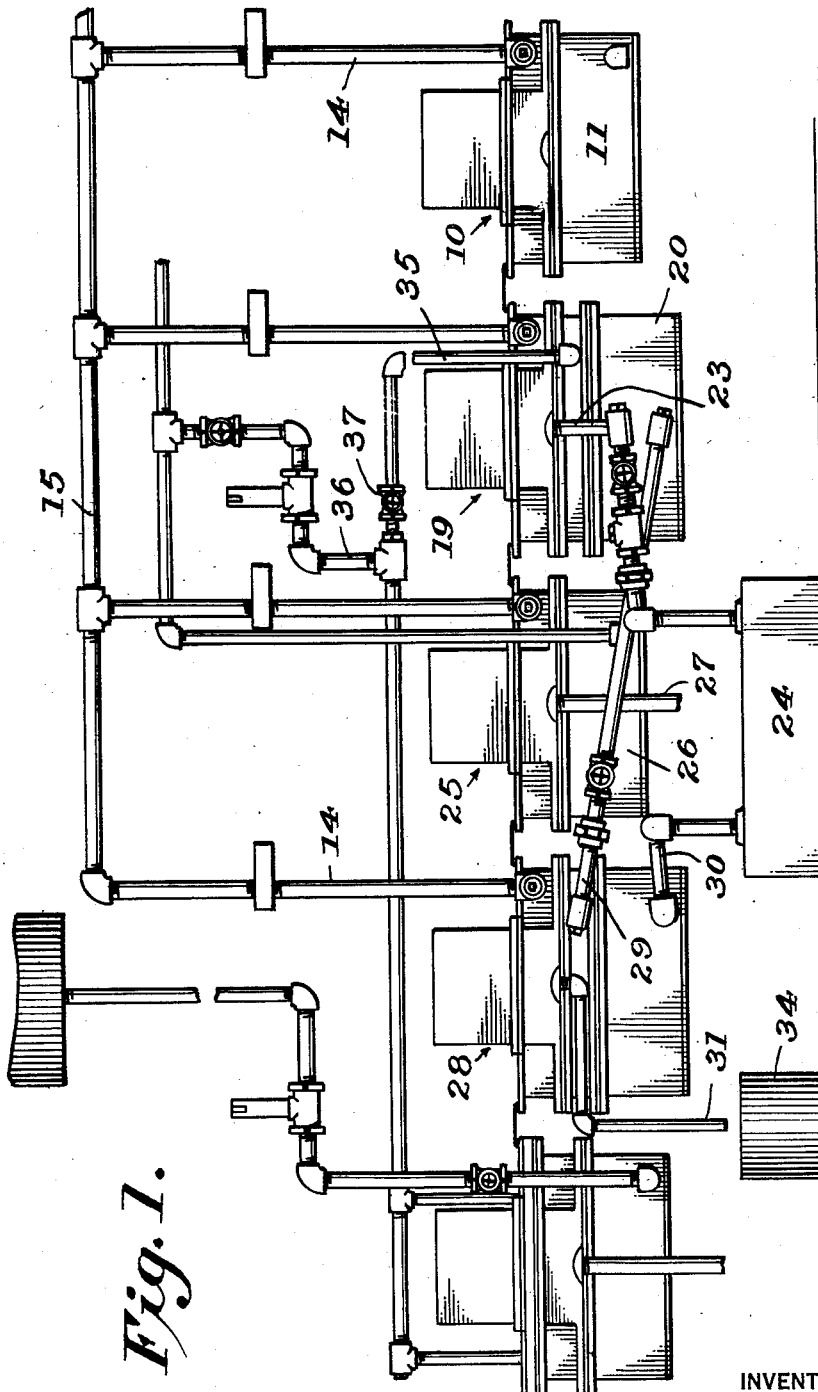
Fig. 1 is a rear view in elevation of a series of article treating units such as are employed in my present invention.

Referring to the drawings in detail, the frosting unit designated generally 10, which is of the usual construction, consists of a tub 11 provided at its upper end with a cover 12, which, like the units ordinarily employed, is provided with spray nozzles 13 over which the articles such as bulbs A are positioned as illustrated in Fig. 2. Upon the admission of air under pressure through a pipe 14 which leads from a main air pressure supply line 15 into the tub 11 above the level of the liquid therein, it will be seen that the liquid contained in the tub 11 will be forced up through the nozzles and into the bulbs A producing an inside frosted surface in the latter. The frosting solution which does not adhere to the insides of the bulbs is drained into the chamber 16 which is formed between the cover 12 and splash deflectors 17 and flows through the valve 18 back into the tub. This is all in accordance with the present type of apparatus employed in bulb frosting plants.

After frosting the bulbs as above described, they are transferred to the rinsing unit 19 which is illustrated in detail in Fig. 3. This unit like that previously described consists of a tub 20 which is provided with a cover 21 carrying spray nozzles 22 for directing the liquid contained in the tub into the interior of the bulbs. This liquid is a dilute frosting solution of a strength approximating that used for fortifying the bulbs and the liquid supply in the tub 20 is maintained by suitable pipe connections which will be more fully hereinafter described. Unlike the frosting unit above referred to, the rinsing unit is not provided with a valve through which the liquid after leaving the bulbs is returned to the tub, but instead the liquid is carried off through a pipe 23 and drains into a settling tank 24. Due to the thin consistency of the rinsing solution, the chemicals adhering to the interiors of the bulbs from the previous treatment are carried out so that by the time the bulbs are transferred to the water rinsing position little if any of the chemicals are carried over with them, the latter having been drained into the settling tank 24.

Figure 4:
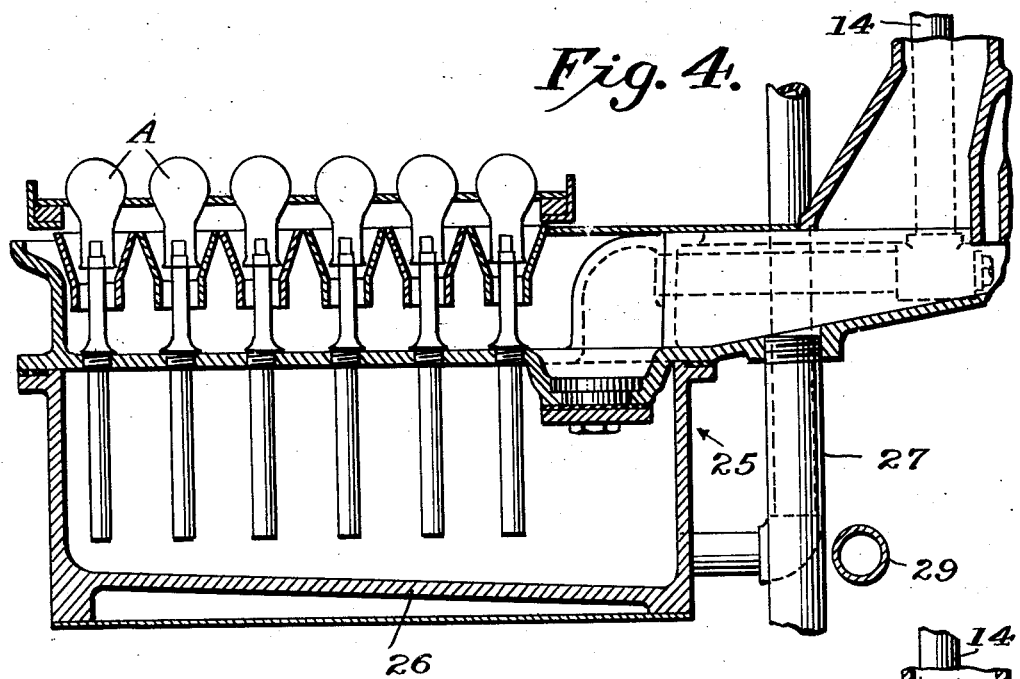
Fig. 4 is a vertical sectional view through the water rinsing unit.
Figure 5:
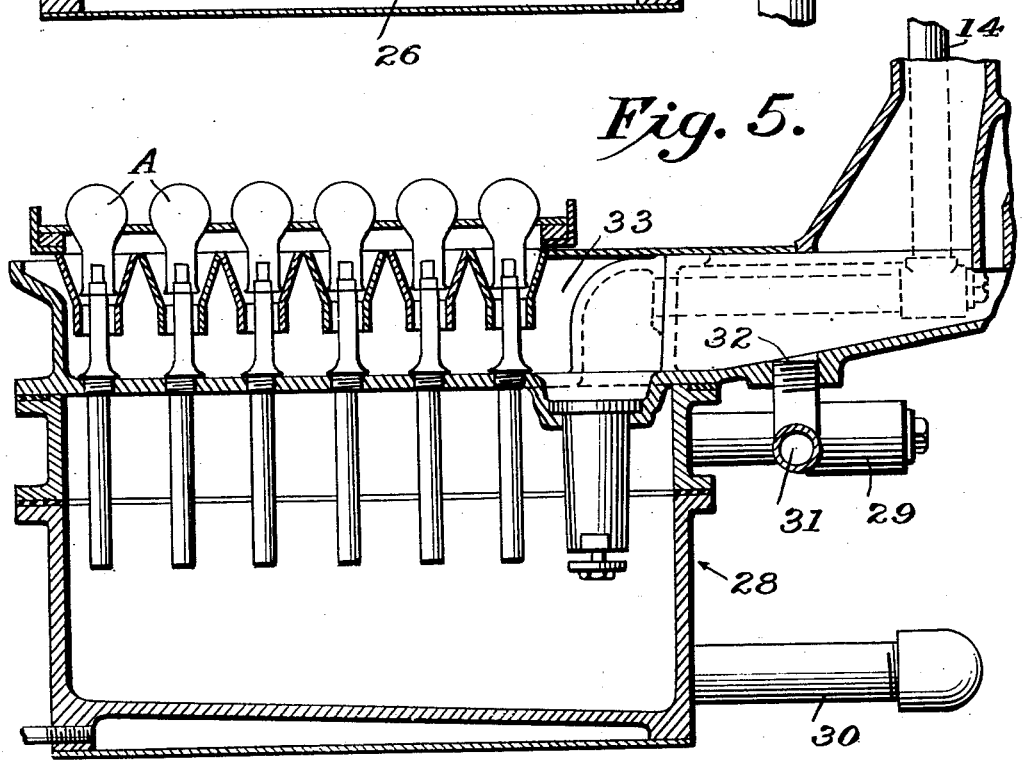
Fig. 5 is a vertical sectional view through the fortifying unit.

In Fig. 4, I have illustrated the water rinsing unit designated generally 25 which consists of a tub 26 of a construction similar to the tub 19 in that instead of returning the liquid which has been sprayed into the bulbs to the tub, it is drained through the pipe 27. Inasmuch as the more valuable chemicals have been previously rinsed out of the bulbs and discharged into the settling tank 24 it becomes evident that the water employed for rinsing the bulbs in unit 25 may be discharged as waste without serious loss of valuable chemical constituents.

After passing through the water rinsing operation, the bulbs are transferred to the fortifying unit 28 which is similar in construction to the frosting unit 10 with the exception that connected with it is a pipe 29 which leads from near the upper edge of the interior of the tub of the fortifying unit to the bottom of the tub 19 so as to maintain a supply of fortifying solution in the latter. Connecting the bottom of the tub of the unit 28 with the settling tank 24 is a supply pipe 30 by means of which the supply of fortifying solution in the unit 28 is maintained. In order to maintain uniform strength of the fortifying solution, which is continually receiving a reinforcing supply of chemicals carried over from the frosting unit into the rinse unit, I supply water to the tub 20 through a stand pipe 35 which receives its fresh water supply from a pipe 36 which is connected to a source water supply (not shown). The flow of water from the pipe 36 into the stand pipe 35 is controlled by means of a suitable valve 37 which may be set to introduce an accurately regulated amount of water into the tub 20. The overflow from the fortifying solution system which is caused by the continual supply of water to the tub 20 is taken care of by means of an overflow pipe 31 which is connected through the overflow aperture 32 with the interior of the chamber 33 corresponding to the chamber 16 of the tub 11. This overflow pipe leads to a suitable receptacle 34 in which the excess fortifying solution is stored and settled so that it may from time to time be used as water in fresh frosting batches.

By rinsing the freshly frosted bulbs with the fortifying solution, which it will be remembered is a weakened frosting solution, it becomes evident that the strength of the fortifying solution is preserved and the chemicals employed in the relatively thick viscous frosting solution are not lost nor is it necessary to employ a recovering plant in order to effect economies in bulb frosting as the only chemicals which are actually lost are those which are carried over on the bulbs from the fortifying position into the water rinsing and final water washing positions. Moreover by introducing the frosting solution which has heretofore been discharged as waste, I save the materials and labor incident to the mixing of a separate fortifying batch. Since the fortifying solution is light and fluid so that it readily drains from the bulbs it becomes evident that the loss of valuable chemicals when my method is employed is negligible.

Uniformity of the frosting and fortifying operation is obtained due to the improved reactions which are produced in employing my method.

These are set forth as follows:

1. By rinsing the frosted articles with fortifying solution before rinsing them with water, I am assured that the whole of the frosting solution is removed from the articles so that they will be entirely free of chemicals when they reach the fortifying position. This enables me to obtain full benefit of the fortifying operation.

2. By employing a settling tank in which the insoluble reaction products in the fortifying solution, namely silico-fluorides, and the undissolved suspended particles of sodium fluoride which form the slurry of the frosting solution, are permitted to separate, I am assured that only active chemicals in a solution free from colloidal suspended matter and abrasive particles are introduced into the articles in the fortifying operation. The silico-fluorides, if not removed from the fortifying solution, tend to adhere locally to the frosted surface during the fortifying process and form a protective coat thus producing spots and streaks in the final frost pattern. The sodium fluoride particles, if not removed from the fortifying solution, may act in an abrasive manner to cut away locally the uniform layer of silico-fluorides formed on the frosted surface and cause non-uniform action of the fortifying solution. The sodium fluoride may also react according to the equation

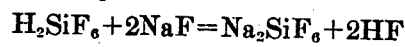

$$H_2SiF_6 + 2NaF = Na_2SiF_6 + 2HF$$

thus producing more silico-fluoride and at the same time fresh acid. Hence a better fortification is obtained than is possible when no settling tank is used.

While in the foregoing there has been shown and described the preferred embodiment of my invention, it is to be understood that minor changes in the details of operation and arrangement of parts may be resorted to without departing from the spirit and scope of my invention as claimed.

Having thus described my invention, what I claim is:

1. The method of treating glass articles which includes rinsing freshly frosted articles with a fortifying solution, adding the rinsings to the fortifying solution together with sufficient water to maintain the proper dilution, conducting the fortifying solution together with the rinsings to a settling tank in order to remove suspended solids, subsequently rinsing the articles with water, fortifying the articles by spraying them with the fortifying solution from which the suspended solids have been removed and washing them with water.

2. The method of treating glass articles which includes frosting them with a relatively viscous frosting solution, rinsing the articles with a fortifying solution containing the same ingredients as the frosting solution but of less viscosity and substantially free from suspended solids, adding sufficient water to the rinsings to maintain the proper dilution, settling the fortifying solution together with the rinsings to remove suspended solids, rinsing the articles with water, fortifying the articles by spraying them with the clarified fortifying solution and washing the frosted and fortified articles.

3. In the process of frosting glass articles, the method of preserving the strength and efficiency of fortifying solutions which comprises introducing between the frosting operation and the usual water rinse an intermediate rinse with fortifying solution to remove the major portion of the concentrated frosting solution adhering to the frosted articles, subsequently adding this rinsing solution to the fortifying solution together with sufficient water to maintain the proper dilution and separating out the insoluble silico-fluorides and the undissolved sodium fluoride.

4. In an apparatus for frosting the inside surface of hollow glass articles a settling tank for separating insoluble silico-fluorides and undissolved sodium fluoride from the fortifying solution.

5. In an apparatus for frosting the inside surface of hollow glass articles the combination in series of a frosting unit, a rinsing unit, a water wash unit, a fortifying unit and a final water washing unit and a settling tank arranged between and connected to the rinsing unit and fortifying unit.

6. In an apparatus for frosting glass articles, the combination of a frosting unit, a rinsing unit, a water wash unit, a fortifying unit and a final water washing unit in a substantially straight line arrangement and a settling tank connected to the rinsing unit and the fortifying unit.

7. In an apparatus for frosting glass articles, the combination of a frosting unit, a rinsing unit, a water wash unit, a fortifying unit and a final water washing unit, the various units being arranged adjacently in a series in the order named and in a substantially straight line and a settling tank connected to the rinsing unit and the fortifying unit.

ROWLAND D. SMITH.